United States Patent [19]

Dugan

[11] Patent Number: 5,710,650

[45] Date of Patent: Jan. 20, 1998

[54] DISPERSION-REDUCING MULTIPLE WAVELENGTH DIVISION MULTIPLEXING OPTICAL FIBER TRANSCEIVER AND METHODS FOR USING AND ASSEMBLING SAME

[75] Inventor: John Michael Dugan, Richardson, Tex.

[73] Assignee: Alcatel Network Systems, Inc., Richardson, Tex.

[21] Appl. No.: 615,974

[22] Filed: Mar. 14, 1996

[51] Int. Cl.$^6$ .................................................. H04J 14/02
[52] U.S. Cl. ........................ 359/133; 359/161; 359/158; 359/173
[58] Field of Search ................................ 359/114, 123, 359/124, 133, 135, 153, 158, 161, 173, 188, 195

[56] References Cited

U.S. PATENT DOCUMENTS 5,162,937  11/1992  Heidemann .............................. 359/124
5,224,183  6/1993  Dugan ...................................... 359/161

*Primary Examiner*—Kinfe-Michael Negash
*Attorney, Agent, or Firm*—Baker & Botts, L.L.P.

[57] ABSTRACT

A dispersion tolerant OC-192 optical transceiver includes the circuitry for implementing the method of reducing optical signal dispersion in a high data rate data stream that travels on an optical fiber communications system. The circuitry includes circuitry for partitioning the high data rate data stream into a plurality of lower data rate data streams. The transceiver transmits the plurality of lower data rate data streams along an associated one of a plurality of separate wavelength channels. A wavelength division multiplexing circuit multiplexes each of the lower data rate data streams on the plurality of separate wavelength channels into a single optical fiber assembly to form a multiplexed signal. The wavelength division multiplexing circuit further transmits the multiplexed lower data rate signal along the single optical fiber assembly.

18 Claims, 2 Drawing Sheets

DISPERSION-REDUCING MULTIPLE WAVELENGTH DIVISION MULTIPLEXING OPTICAL FIBER TRANSCEIVER AND METHODS FOR USING AND ASSEMBLING SAME

TECHNICAL FIELD OF THE INVENTION

This invention relates in general to communications systems and circuits and, more particularly, to an optical communications circuit. Even more particularly, the present invention relates to a dispersion-tolerant 10 gigabit-per-second (Gb/s) optical carrier transceiver that overcomes chromatic dispersion and polarization mode dispersion limitations of standard single-mode optical fiber transceiver units.

BACKGROUND OF THE INVENTION

Existing long-haul 2.5 Gb/s optical fiber transmission systems in telecommunication applications frequently employ signal regeneration equipment separated by distances of 40 to 100 km. Prior to the advent of commercially available optical amplifiers, regeneration of the optical signal was required approximately every 100 km or less to restore the optical signals to their original characteristics. With commercially available optical amplifiers, distances between regeneration sites can be much greater, using optical amplifiers spaced every 80 km or so to amplify the optical signal. However, the optical amplifiers by themselves are not capable of restoring all of the signal characteristics. Regeneration is therefore still required, but the regeneration sites can be separated by much greater distances, as much as 600–1000 km.

To increase the transmission capacity of single-mode optical fiber, two techniques are commonly considered: wavelength-division multiplexing (WDM) or time-division multiplexing (TDM). In the past, TDM has almost always been the method of choice, providing the lowest cost and most practical solution. Initial applications of single-mode fiber were operated at data rates considered low by today's standards, in the range of 100–150 megabits-per-second. Over time, the data rate per fiber has increased tremendously, migrating through several intermediate rates to the current standard of 2.5 Gb/s, by using TDM techniques alone. The 2.5 Gb/s data rate is known as SONET OC-48, or SDH STM-16, depending on the particular telecommunication standard being followed.

The next logical migration step for capacity enhancement is to use a data rate of 10 Gb/s, which is a factor of four increase over the current standard. In SONET applications, this data rate is referred to as OC-192. However, there are several new considerations that impede the use of TDM for this data rate. In particular, chromatic dispersion and polarization mode dispersion of standard single-mode fiber place a limit on the maximum transmission distance between regeneration sites, even if the associated optical communication system uses optical amplifiers.

Techniques exist for extending the transmission distance through standard single-mode fiber (SSMF) operated at 10 Gb/s TDM. Various transmitter modulation methods, of which pre-chirp, duobinary, and dispersion-supported transmission are examples, can extend the regeneration distance to 150–200 km. Dispersion compensating fiber is also an available method, in which the chromatic dispersion of the fiber span is partially canceled. However, dispersion compensating fiber does not reduce the polarization mode dispersion, and further, requires additional optical amplification to overcome the loss of the compensating fiber. In any case, the upgrade of an existing OC-48 system to OC-192 via TDM may require regenerators separated by distances considerably less than desired. The reduced spacing of regenerators may cause the cost of the upgrade to be prohibitively high, due to the high cost of the 10 Gb/s regenerators.

WDM techniques can be used to achieve the desired regeneration distances. Configurations using inline optical amplifiers and wavelength-division multiplexed OC-48's are often more cost effective for regeneration spans of 600 km. However, service providers, in general, avoid using wavelength division multiplexed systems. This is because, among other reasons, there are no well-defined industry-standard wavelength division multiplexing channel plans. Also, different system vendors often provide less than reliable compatibility with other vendors. There exists a lack of cost-effective wavelength division multiplexed systems, as well as system complexities and unacceptable costs that arise due to different systems requiring different and disparate spares, maintenance, and repairs. Moreover, since each OC-48 system makes up a separate network element in a wavelength multiplexed network, grooming, or the ability to connect a channel from one OC-48 system to another, between multiple OC-48 channels often becomes highly problematic.

As a result of the above, there is need for an OC-192 system that can span 600 kilometers of standard single-mode fiber between regeneration sites and that uses in-line amplifiers at intermediate sites.

There is a need for a method and system that overcomes chromatic dispersion and polarization mode dispersion in communication system optical fibers, especially with data rates of 10 Gb/s and higher.

There is a need for a method and system that overcomes existing transmission distance limitations without the additional expense and signal losses that accompany dispersion-compensated fiber approaches.

There is a need for a method and system that overcomes chromatic and polarization mode dispersion phenomena without the further limitation of distance and data rate limitations that exist with pre-chirping, duobinary, and dispersion-supported transmission techniques.

There is a further need for a method and system that overcomes the chromatic and polarization mode dispersion phenomena of standard-mode optical fibers without the limitations that exist with wavelength division multiplexed approaches at distances of greater than 200 kilometers and data rates of 10 Gb/s and higher.

There is also a need for a way to provide the advantages of wavelength division multiplexing without the system complications and costs of conventional wavelength division multiplexing technologies.

SUMMARY OF THE INVENTION

In accordance with the present invention, there is provided a dispersion-tolerant OC-192 transceiver that substantially eliminates or reduces disadvantages and problems associated with previously-developed optical transceivers and that substantially overcomes limitations associated with chromatic dispersion and polarization mode dispersion of standard single-mode optical fiber transmission systems.

According to one aspect of the present invention, there is provided a system that reduces the effects of chromatic and polarization mode dispersion in single-mode optical fibers by performing the steps of splitting the high-speed data stream into four lower-rate streams at the transmit end of the system or the equivalent functions thereof. The present invention sends each lower-rate stream via separate wavelength channels. Prior to transmission, the separate wavelength channels are multiplexed into one fiber. The transceiver of the present invention transmits the wavelength division multiplexed signal on a standard single-mode optical fiber. In the receive mode of operations, the transceiver receives a wavelength division multiplexed signal from a standard single-mode optical fiber. The transceiver system then splits the individual wavelength apart at the receive-end using a wavelength demultiplexer. Further, the present invention recovers the lower-rate data streams and recombines the lower-rate streams into the original high-data rate data stream, or the equivalents thereof.

A technical advantage that the present invention provides is a system that looks and acts as a conventional OC-192 system, having all of the advantages of OC-192 with regard to grooming, but with the capability to achieve a 600 km or greater regeneration span.

Another technical advantage of the present invention is that it appears as a single integrated network element. No wavelength division multiplex system strategy or administration issues exist with the present invention for users desiring standard single-mode fiber with rates of up to and including 10 Gb/s.

Another technical advantage of the present invention is that it eliminates the needs for the user to buy all of its optical communications systems from a single supplier, including, for example, terminal equipment, wavelength division multiplexed systems, amplifiers, and span design to overcome the inherent system disparities among the different wavelengths diversion multiplexing system vendors. The present invention is compliant with both closed-space and wide-space wavelength division multiplexing schemes and, as a practical matter, may fully eliminate the need for an OC-192 regenerator.

BRIEF DESCRIPTION OF THE DRAWINGS

A more complete understanding of the present invention and advantages thereof may be acquired by referring to the following description taken in conjunction with the accompanying drawings in which like reference numerals indicate like features and wherein.

DETAILED DESCRIPTION OF THE INVENTION

Figure 1:
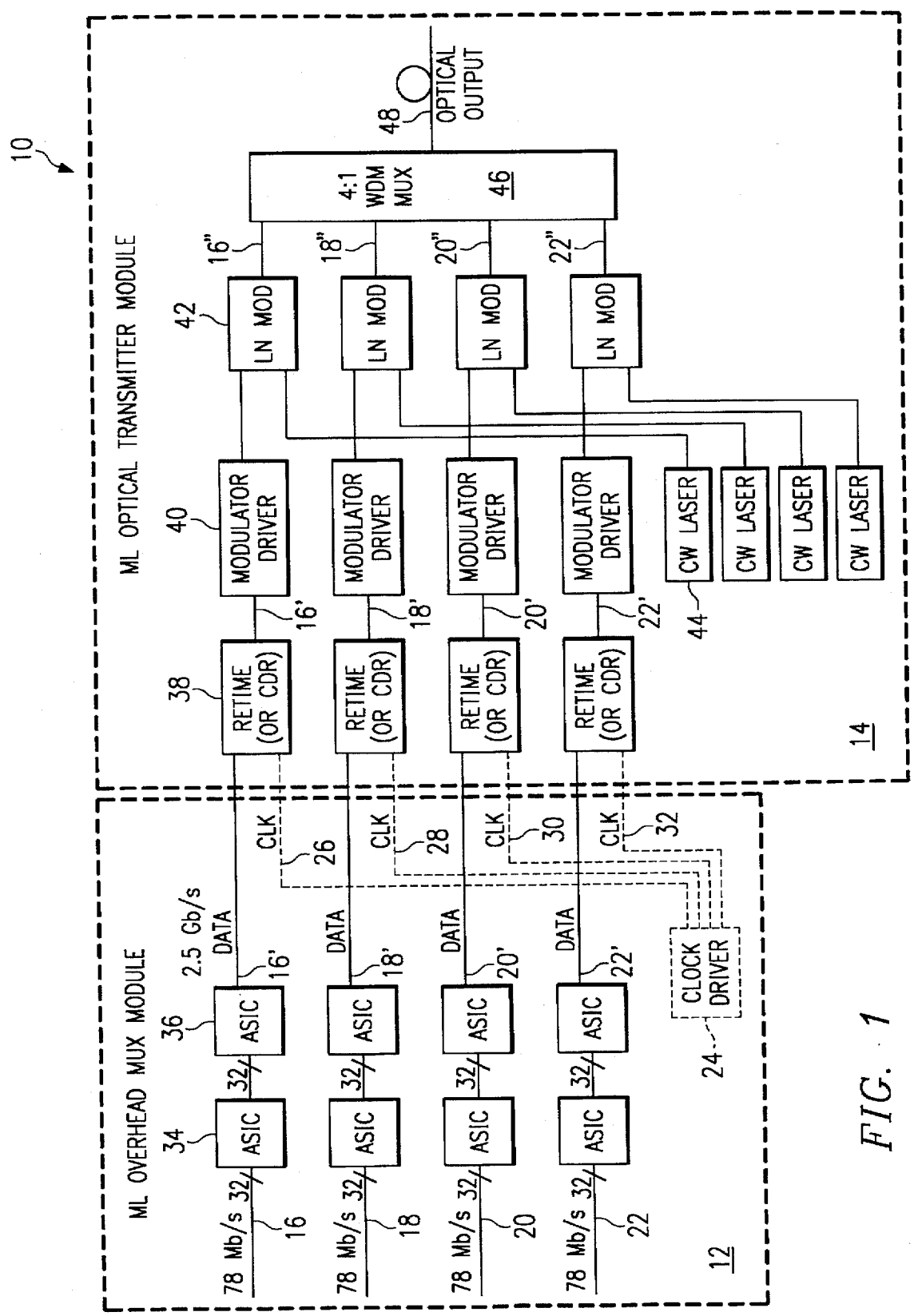
FIG. 1 illustrates an optical transmitter portion of the transceiver implementation of the present embodiment.

The following description first includes a further definition of the context and limitations of the state of the art prior to the present invention. Thereafter, the structure and function of the present invention are described through one of the many possible illustrative embodiments.

To begin, the velocity at which an optical pulse travels in a fiber depends on its wavelength. Chromatic dispersion is a term that describes the spreading or distortion of an optical pulse as it propagates down the fiber. All optical sources have a finite spectral width, and therefore contain a range of wavelengths. Furthermore, when an optical source is modulated, for instance, with a binary data stream, the spectral width increases somewhat. The net effect is that a pulse will in general become distorted or broadened as it propagates down the fiber. This distortion interferes with the recovery of the data. Often, the point at which the operation of the receiver is impaired by 1–2 dB is considered the maximum amount of dispersion that can be tolerated. Even though the interaction of the transmitter and the fiber are responsible for the pulse distortion, the "receiver dispersion power penalty" is commonly used as the measure of the effect.

So-called "standard" single-mode fiber (SSMF) has a dispersion value of approximately 20 picoseconds per nanometer-kilometer in the 1550 nm wavelength range. This means that if two identical signals are being transmitted down the fiber, with one signal at 1550 nm and the other one at 1551 nm, then after one kilometer of fiber, the signals are separated in time by 20 picoseconds.

Dispersion-limited distances for OC-48 signals in SSMF are approximately 200 km for directly modulated distributed feedback (DFB) lasers, approximately 400 km for electro-absorption (EA) lasers, and 600–1000 km for continuous-wave lasers that are modulated externally with a lithium niobate modulator. Dispersion-limited distances for OC-192 signals in SSMF are approximately 80 km for EA lasers and when using lithium niobate modulators.

The tolerance of an optical transmission system to chromatic dispersion can be improved by means of special modulation techniques, such as pre-chirping the laser, or with optical duobinary transmission, or with dispersion-supported transmission, among others. Alternatively, the net chromatic dispersion of an optical span can be reduced by means of a special fiber known as dispersion compensating fiber (DCF). DCF has a negative value of dispersion that partially cancels the dispersion of the main fiber span. For example, an SSMF fiber span of 100 km may have an end-to-end dispersion value of +2000 ps/nm. By adding a length of DCF (which is commonly packaged on a small reel) with a dispersion of −1500 ps/nm in series with the fiber span, the net dispersion is reduced to only 500 ps/nm. However, the loss of this DCF is typically in the range of 12 dB, which often means that an additional optical amplifier is needed to make up for the added loss. This results in DCF being a fairly expensive approach. The cost penalty can be reduced somewhat in the case of multiple WDM signals, since the DCF is compensating all channels simultaneously, therefore amortizing the cost over the number of channels in use.

Even "single-mode fiber" has in fact two propagating modes, the two orthogonal polarization states of the signal. In perfect single-mode fiber, both of these polarization modes travel at the same velocity, therefore behaving as if only one polarization mode were applied. In real fiber, however, there will often be slightly different velocities associated with each polarization state. The amount of time delay difference is called polarization mode dispersion (PMD), and is generally accepted to have dimensions of picoseconds per root-kilometer. New fiber is measured for PMD, with specifications in the 0.1 ps/km$^{-\frac{1}{2}}$ ballpark. A typical value for PMD of old fiber is unknown. There has been some evidence that PMD of installed fiber is in the range of 1–2 ps/km$^{-\frac{1}{2}}$ in many cases. As an example, with a value of 2 ps/km$^{-\frac{1}{2}}$ a span of 100 km would have 20 ps of PMD. The threshold for PMD to become a problem is around 10% of the bit interval. At 2.5 Gb/s, with a bit interval of 400 ps, the regenerated fiber span would have to be 400 km long before the effect would be noticed. However, at 10 Gb/s, the span would reach its PMD limit at only 25 km. This could potentially make operation at 10 Gb/s impossible at typical spans of 80 km or more. There is no known practical method to compensate for excessive PMD, except for WDM. Because of the square-root dependence on length, four WDM 2.5 Gb/s signals reach the PMD limit at a distance sixteen times greater than a 10 Gb/s signal.

To address these prior limitations, FIG. 1 illustrates the optical transmitter used for one transceiver embodiment of the present invention. In FIG. 1, the optical transmitter portion 10 includes overhead multiplexer module 12 and optical transmitter module 14, both of which are shown within dash lines. Overhead multiplexer module 12 includes four 32-line groupings. Each 32-line grouping carries data at a rate of 78 Gb/s, including 32-line grouping 16, 32-line grouping 18, 32-line grouping 20, and 32-line grouping 22. In addition, overhead multiplexer module 12 includes clock driver 24 that sends clock signals 26, 28, 30, and 32 from overhead multiplexer module 12 to optical transmitter module 14. For providing overhead data and other information relative to the signals that 32-line groupings 16, 18, 20, and 22 carry, overhead multiplexer module 12 includes application-specific integrated circuits 34 and 36. Application specific integrated circuit 36 generates an output to module 14 on data lines 16', 18', 20' and 22', which operate at a data rate of 2.5 Gb/s.

Optical transmitter module 14 includes retimer circuits 38 and modulator driver circuits 40 for each 2.5 Gb/s data line 16', 18', 20', and 22'. Modulator driver circuit 40 provides input to lithium niobate (LN) modulation circuit 42, as well as does continuous wave laser 44 for each of the lines 16", 18", 20", and 22". For the LN modulation circuits 42, each line 16", 18", 20", and 22" feeds to 4:1 wavelength division multiplexer circuit 46. The 4:1 wavelength division multiplexer circuit 46 generates optical output 48, which may be amplified as the output of optical transmitter module 14. The 4:1 wavelength division multiplexer circuit 46 may be physically located in optical transmitter module 14 as shown, or may be located in a separate equipment unit.

In essence, therefore, optical transmitter portion 10 includes overhead multiplexer module 12 and optical transmitter module 14 that includes four independent 2.5 Gb/s optical transmitters that are multiplexed together into one standard single-mode fiber prior to reaching the output connector. Several design characteristics affect optical transmitter portion 10. There are at least three possible laser options that the present embodiment may employ. A directly modulated distributed feedback (DFB) laser may be used. This may not be practical, however, due to the roughly 200-kilometer limitation of DFB lasers operated at 2.5 Gb/s in standard single-mode fiber. It may, alternatively be practical to use an electro-absorptive (EA) laser, which has a dispersion tolerance of roughly 400 kilometers. A third possibility would be to use a lithium niobate (LN) modulator, which results in a dispersion tolerance of 600 to 1000 kilometers. In the optical transmitter portion 10, the separation of the individual wavelengths may be 100 GHz, 200 GHz, or other value, depending on the applicable system standards of user preference. Additionally, low-frequency analog identification tones may be inserted on each 2.5 Gb/s optical channel for channel balance control in the transmitter as well as for channel power monitoring and path diagnostics in downstream optical amplifiers.

Figure 2:
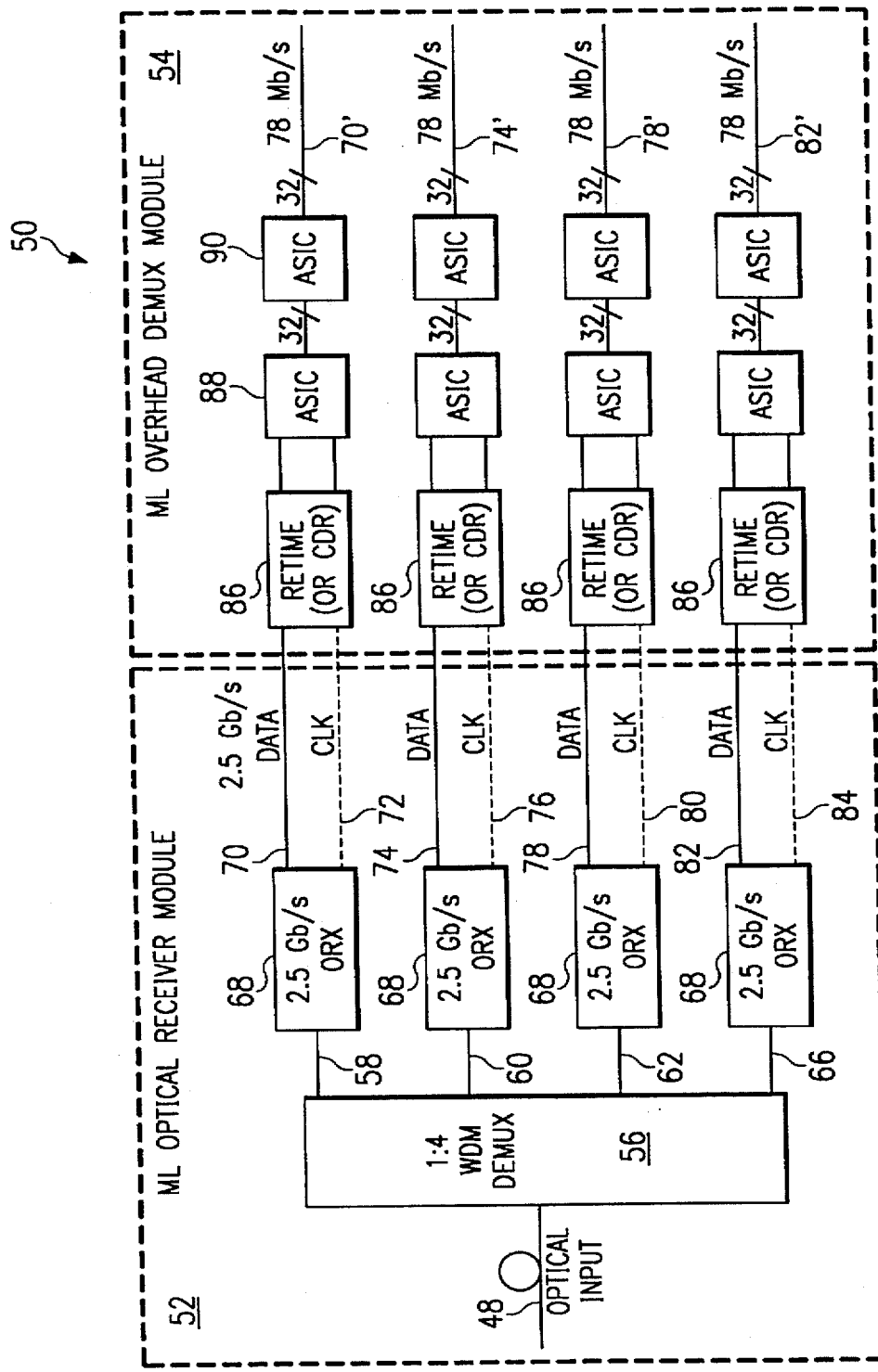
FIG. 2 illustrates an optical receiver portion of the transceiver implementation of the present embodiment.

The optical receiver that the OC-192 transceiver of the present invention uses includes input fiber 48 and a 1:4 wavelength division demultiplexer circuit. Following the 1:4 wavelength division demultiplexer circuit are four independent 2.5 Gb/s optical receiver modules. FIG. 2, in particular, shows optical receiver portion 50 for one embodiment of the invention that includes optical receiver module 52 and overhead demultiplexer module 54. From optical fiber 48, input goes to 1:4 wavelength division demultiplexer circuit 56. The 1:4 wavelength division demultiplexer circuit 56 may be physically located in the optical receiver module 52 as shown, or may be located in a separate equipment unit. The 4:1 wavelength division demultiplexer circuit 56 takes the signal of optical fiber 48 to generate four signals along 2.5 Gb/s line 58, 2.5 Gb/s line 60, 2.5 Gb/s line 62, and 2.5 Gb/s line 66. Each of 2.5 Gb/s lines 58, 60, 62, and 66 goes to an associated 2.5 Gb/s ORX circuit 68. 2.5 Gb/s ORX circuit 68 outputs data on line 70 from 2.5 Gb/s line 58 as well as a clock signal on clock signal line 72. An associated 2.5 Gb/s ORX circuit 68 produces data on 2.5 Gb/s line 74 and a clock signal on clock signal line 76 from 2.5 Gb/s 60. The associated 2.5 Gb/s ORX circuit 68 associated with 2.5 Gb/s line 62 produces a signal on 2.5 Gb/s 78 and a clock signal on clock signal line 80. 2.5 Gb/s ORX circuit 68 that associates with 2.5 Gb/s line 66 produces data on 2.5 Gb/s 82 and clock signal on clock signal line 84. The 2.5 Gb/s line 70 and clock signal line 72 connect to retime circuit 86 of overhead demultiplexer module 54. Identical retime circuits 86 also associate with data line 74 and clock signal line 76, data line 78 and clock signal line 80, and data line 82 and clock signal line 84. Application-specific integrated circuits 88 and 90 receive and process the 2.5 Gb/s signals from retime circuits 86 for the respective 32-line groupings 70', 74', 78', and 82'.

A technical advantage of the present invention is that optical transmitter 10 requires no high-data rate application specific integrated circuits that operate at 10 Gb/s. The ASICs 34 and 36 include the functions of overhead insertion, 32:1 multiplex function, and provide 2.5 Gb/s data rails. These data rails may be accommodated on optical transmitter 10 for modules that interface the OC-192 transceiver of the present invention. Moreover, any timing skew or misalignment that may exist between the signals on 32-line groupings 16, 18, 20 and 22 may be accommodated by the separate processing of data through ASICs 88 and 90. The ASICs 88 and 90 accept 2.5 Gb/s data rails at input, and include 1:32 demultiplexer function and an overhead removal function.

Preferably, optical specifications for the present embodiment include the output power from optical transmitter 10 to have a minimum total output power of −5/dbm, with −11/dbm per channel. The receiver sensitivity of optical receiver 50 should be −15/dbm (total) at $10^{-12}$ BER. The present embodiment supports a dispersion tolerance of 12,000 ps/nm. Moreover, the spectral width of the present embodiment is preferably 5/nm, assuming 200 GHz spacing between the four wavelength-division- multiplexed optical signals. With the system configuration as described herein, achieving these specifications is well within the capability of a person of ordinary skill in the art.

The present invention makes possible the desired splitting of the signals with 2.5 Gb/s data rails that can be supplied and accommodated on the modules that interface to the transmitter and receiver circuitry. The timing skew between four optical channels may be accommodated by the separate processing of data through the application-specific integrated circuits for the particular optical communications applications. In implementation, it is desired that 2.5 Gb/s signals pass between adjacent modules on the respective back planes, i.e., from overhead multiplexer module 12 to optical transmit module 14 as well as from optical receiver module 52 to overhead demultiplexer module 54. The present embodiment has the attractive characteristic that it accommodates the dispersion that exists in the fiber that makes all wavelengths travel at slightly different velocities. Optical fiber 48, therefore, transmits not just one wavelength, but four wavelengths, each of which arrives at a different time, even though the signals all were transmitted synchronously. At a distance of 600 kilometers or more, for example, it is quite possible for data signals to be separated in time from one another by as much as 150 bits or more. In some circuits, therefore, it may be necessary to devise a circuit to compensate for this time shift. This is not the case with the present embodiment. With the present embodiment, it does not matter what the arrival times are of each of those four signals as explained below.

Even though the throughput data rate of the system is 10 Gb/s, the majority of signal processing is done at a data rate of 51 Mb/s, with subsequent multiplexing to bring all of the data into one signal line at 10 Gb/s. Processing the signals in parallel at 51 Mb/s saves a considerable amount of size, power, and cost of the electronic circuitry. After a significant amount of the signal processing is done, the one hundred ninety-two 51 Mb/s signals are divided into four groups, with each group containing 2.5 Gb/s worth of data, for processing into the final 10 Gb/s data stream. The innovation here avoids combining the four groups electrically, but rather, combines them optically via WDM in the transmitter. Likewise, at the receive end of the system, the signals are processed in four groups following the optical receiver.

A potential major difficulty is re-aligning the four groups in time at the receive end. At 12,000 ps/nm of chromatic dispersion and with 5 nm wavelength separation between the two end wavelengths, the first group could be misaligned in time by 60 nanoseconds with respect to the fourth group. To have a variable delay that could accommodate 0–60 nanoseconds of delay at 2.5 Gb/s would be difficult, involving shift registers of 150 bits in length. This would be very difficult because of the circuit technology required for operation at 2.5 Gb/s. However, by breaking down the signals back into the original 51 Mb/s components, the same 0–60 nanoseconds of delay requires only three bits of delay, in low-data rate circuitry that can easily accommodate the function. Even though the function has to be performed on forty-eight 51 Mb/s data signals simultaneously, it is still far easier than the same operation running at 2.5 Gb/s. Furthermore, there may be other ways in which the delay difference may be any arbitrary amount. With the present embodiment, however, there is not a real need for this embellishment. The present embodiment, without this feature, clearly achieves the purposes of the present invention.

Although the present invention has been described in detail, it should be understood that various changes, substitutions, and alterations can be made hereto without departing from the spirit and scope of the invention as defined by the appended claims.

What is claimed is:

1. A method for reducing the effects of optical signal dispersion in a high data rate data stream traveling on an optical fiber communications system, comprising the steps of:

partitioning the high data rate data stream into a plurality of lower data rate data streams;

transmitting each of said plurality of lower data rate data streams along an associated one of a plurality of separate wavelength channels;

multiplexing each of said lower data rate data streams on said plurality of separate wavelength channels into a lower data rate optical fiber assembly to form a multiplexed signal;

transmitting said multiplexed lower data rate signal along said lower data rate optical fiber assembly;

receiving said lower data rate data streams from said lower data rate optical fiber assembly; and demultiplexing said lower data rate data streams including the necessary time re-alignment of said lower rate date streams, to form a received high data rate data stream.

2. The method of claim 1, further comprising the step of transmitting said plurality of lower data rate data streams with limited chromatic dispersion a distance of not less than approximately 600 km or more.

3. The method of claim 1, further comprising the step of transmitting said plurality of lower data rate data streams with limited polarization mode dispersion a distance of not less than approximately sixteen times the distances achievable using TDM multiplexing methods.

4. The method of claim 1, further comprising the step of performing wavelength division multiplexing steps in a manner that is not noticeable to a system user.

5. The method of claim 1, further comprising the step of transmitting said plurality of lower data rate data streams through a single optical fiber.

6. The method of claim 1, further comprising the step of transmitting said plurality of lower data rate data streams at a data rate of significantly less than 10 Gb/s.

7. An apparatus for reducing the effects of optical signal dispersion in a high data rate data stream traveling on an optical fiber communications system, comprising:

partitioning circuitry for partitioning the high data rate data stream into a plurality of lower data rate data streams;

separate wavelength transmission circuitry for transmitting each of said plurality of lower data rate data streams along an associated one of a plurality of separate wavelength channels;

multiplexing circuitry for multiplexing each of said lower data rate data streams on said plurality of separate wavelength channels into a single optical fiber assembly to form a multiplexed signal;

lower data rate fiber transmission circuitry for transmitting said multiplexed lower data rate signal along said single optical fiber assembly;

receiving circuitry for receiving said lower data rate data streams from said single optical fiber assembly; and demultiplexing circuitry for demultiplexing said lower data rate data streams, including the necessary time re-alignment of said lower rate date streams, to form a received high data rate data stream.

8. The apparatus of claim 7, wherein said lower data rate fiber transmission circuitry further comprises circuitry for transmitting said plurality of lower data rate data streams with limited chromatic dispersion a distance of not less than approximately 600 km or more.

9. The apparatus of claim 7, wherein said lower data rate transmission circuitry further comprises circuitry for transmitting said plurality of lower data rate data streams with limited polarization mode dispersion a distance of not less than approximately sixteen times the distances achievable using TDM multiplexing methods.

10. The apparatus of claim 7, wherein said multiplexing circuitry further comprises circuitry for performing wavelength division multiplexing steps in a manner that is not noticeable to a system user.

11. The apparatus of claim 7, wherein said lower data rate transmission circuitry further comprises circuitry for transmitting said plurality of lower data rate data streams through a single optical fiber.

12. The apparatus of claim 7, wherein said lower data rate transmission circuitry further comprises circuitry for transmitting said plurality of lower data rate data streams at a data rate of significantly less than 10 Gb/s.

13. A method for assembling an apparatus for reducing the effects of optical signal dispersion in a high data rate data stream traveling on an optical fiber communications system, said method comprising the steps of:

assembling partitioning circuitry for partitioning the high data rate data stream into a plurality of lower data rate data streams;

assembling separate wavelength transmission circuitry for transmitting each of said plurality of lower data rate data streams along an associated one of a plurality of separate wavelength channels;

assembling multiplexing circuitry for multiplexing each of said lower data rate data streams on said plurality of separate wavelength channels into a single optical fiber assembly to form a multiplexed signal;

assembling lower data rate fiber transmission circuitry for transmitting said multiplexed lower data rate signal along said single optical fiber assembly;

assembling receiving circuitry for receiving said lower data rate data streams from said single optical fiber assembly; and assembling demultiplexing circuitry for demultiplexing said lower data rate data streams, including the necessary time re-alignment of said lower rate date streams, to form a received high data rate data stream.

14. The method of claim 13, further comprising the steps of assembling said lower data rate fiber transmission circuitry to comprise circuitry for transmitting said plurality of lower data rate data streams with limited chromatic dispersion a distance of not less than approximately 600 km or more.

15. The method of claim 13, further comprising the steps of assembling said lower data rate transmission circuitry to comprise circuitry for transmitting said plurality of lower data rate data streams with limited polarization mode dispersion a distance of not less than approximately sixteen times the distances achievable using TDM multiplexing methods.

16. The method of claim 13, further comprising the steps of assembling said multiplexing circuitry to comprise circuitry for performing wavelength division multiplexing steps in a manner that is not noticeable to a system user.

17. The method of claim 13, further comprising the steps of assembling said lower data rate transmission circuitry to comprise circuitry for transmitting said plurality of lower data rate data streams through a single optical fiber.

18. The method of claim 13, further comprising the steps of assembling said lower data rate transmission circuitry to comprise circuitry for transmitting said plurality of lower data rate data streams at a data rate of significantly less than 10 Gb/s.

* * * * *